United States Patent
Kiest, Jr.

(10) Patent No.: US 8,651,145 B2
(45) Date of Patent: Feb. 18, 2014

(54) END SEAL

(75) Inventor: Larry W. Kiest, Jr., Ottawa, IL (US)

(73) Assignee: LMK Technologies, LLC, Chicago, IL (US)

( * ) Notice: Subject to any disclaimer, the term of this patent is extended or adjusted under 35 U.S.C. 154(b) by 0 days.

(21) Appl. No.: 13/466,200

(22) Filed: May 8, 2012

(65) Prior Publication Data

US 2012/0217708 A1 Aug. 30, 2012

Related U.S. Application Data

(63) Continuation of application No. 13/045,778, filed on Mar. 11, 2011, now Pat. No. 8,240,341, which is a continuation-in-part of application No. 12/962,276, filed on Dec. 7, 2010, now Pat. No. 8,240,340.

(51) Int. Cl.
*F16L 55/16* (2006.01)

(52) U.S. Cl.
USPC ......... 138/98; 138/97; 405/184.2; 405/150.1; 156/287; 156/293; 264/269

(58) Field of Classification Search
USPC ......... 138/98, 97; 405/184.2, 150.1; 156/294; 264/568, 269
See application file for complete search history.

(56) References Cited

U.S. PATENT DOCUMENTS

| | | | |
|---|---|---|---|
| 3,781,966 A * | 1/1974 | Lieberman | 29/890.031 |
| 5,368,075 A * | 11/1994 | Baro et al. | 138/98 |
| 5,587,126 A | 12/1996 | Steketee, Jr. | |
| 5,738,146 A | 4/1998 | Abe | |
| 5,879,501 A | 3/1999 | Livingston | |
| 5,915,419 A | 6/1999 | Tweedie et al. | |
| 6,068,725 A | 5/2000 | Tweedie et al. | |
| 6,328,310 B1 | 12/2001 | Chikaraishi | |
| 6,541,106 B1 | 4/2003 | von Fay et al. | |
| 6,641,688 B1 | 11/2003 | Gearhart | |
| 6,651,699 B2 | 11/2003 | Kweon | |
| 6,994,118 B2 | 2/2006 | Kiest et al. | |
| 7,094,308 B1 | 8/2006 | Gearhart | |
| 7,131,791 B2 | 11/2006 | Whittaker et al. | |
| 7,670,086 B2 | 3/2010 | Kiest et al. | |
| 2005/0241713 A1 | 11/2005 | Kaneta et al. | |
| 2006/0130922 A1 | 6/2006 | Kamiyama et al. | |
| 2009/0056823 A1 | 3/2009 | Kiest, Jr. | |
| 2009/0194184 A1 | 8/2009 | Kiest, Jr. | |
| 2010/0018631 A1 | 1/2010 | Kiest et al. | |

\* cited by examiner

*Primary Examiner* — Patrick F Brinson
(74) *Attorney, Agent, or Firm* — McKee, Voorhees & Sease, P.L.C.

(57) ABSTRACT

A kit, apparatus, and method for sealing a junction between a manhole and a pipe within a sewer system are provided. In a first embodiment, the end of a pipe adjacent a manhole is sealed by the use of a pipe liner and a tubular sleeve made of a hydrophilic material. The tubular sleeve is held in place by a mechanical fastener and a pipe liner is installed or otherwise placed through the tubular sleeve and against the wall of the pipe. In a second embodiment, a majority of the area surrounding a junction of a pipe and a manhole is sealed by the use of a tubular sleeve made of a hydrophilic material including a flange portion, a mechanical fastener, a pipe liner, and a manhole liner.

33 Claims, 9 Drawing Sheets

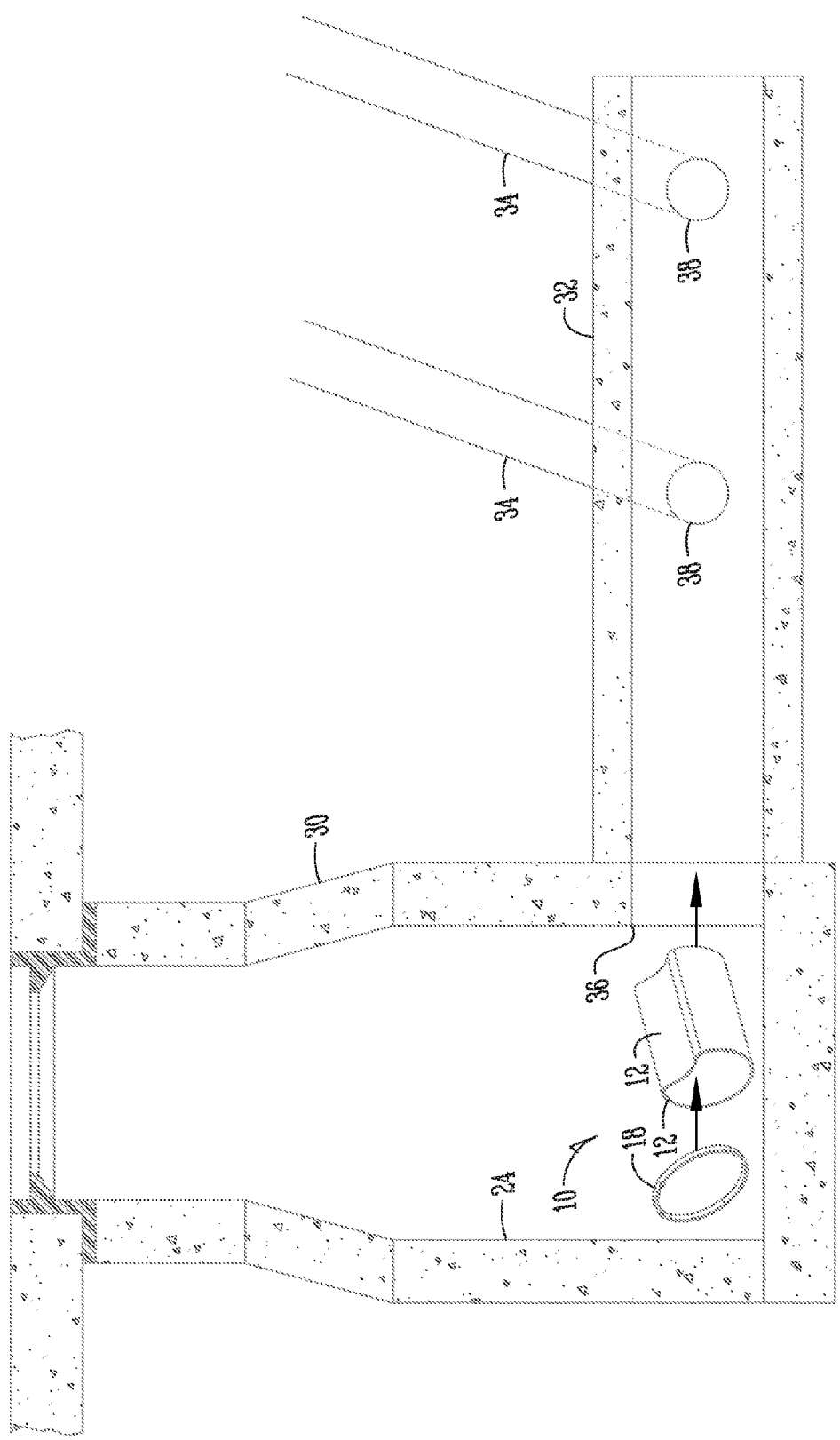

END SEAL

CROSS-REFERENCE TO RELATED APPLICATIONS

This application is a Continuation Application of U.S. Ser. No. 13/045,778 filed Mar. 11, 2011, which is a Continuation-in-Part Application of U.S. Ser. No. 12/962,276, filed on Dec. 7, 2010, herein incorporated by reference in their entirety.

FIELD OF THE INVENTION

The invention relates generally to an apparatus and method for repairing the junction between a manhole and a buried pipe in fluid communication with the manhole, such as underground sewer pipe and the like. More particularly, but not exclusively, the invention relates to a kit, apparatus, and method to seal the junction of a pipe and a manhole using pipe liners in conjunction with a tubular sleeve made of a hydrophilic material using a mechanical fastener to hold the tubular sleeve in place during liner installation.

BACKGROUND OF THE INVENTION

As the infrastructure of major cities and towns in the developed world age, the sewer systems weaken. Pipe degradation, system blockage, water infiltration, and sewer leakage are major problems that aging sewer systems experience. As these problems persist, the sewer system may eventually experience total failure and entire sections of the sewer system may collapse. As a result, sinkholes may form and sewers may back up into homes and places of business. One method of addressing this critical infrastructure problem is the use of pipe lining techniques to rehabilitate existing sewer systems.

Cured-in-place pipelining is one such technique that includes rehabilitating an existing sewer system by creating a new pipe within an existing pipe. A liner, impregnated with a resinous material capable of curing and hardening, is inverted or pulled into a damaged pipe. The liner is pressed against the wall of the existing pipe, and the resinous material is allowed to cure and harden. The result is a replacement pipe having the older pipe or "host pipe" on the exterior. The cured-in-place pipe acts to alleviate the problems caused by structural defects and blockages in the existing sewer system. Even in sewer systems where the main pipes have been rehabilitated with a cured-in-place pipe or other pipe liners, problems still arise. Some of those problems are caused by shrinkage of the pipe liner and unsealed connections at service and manhole junctions.

Shrinkage of a pipe liner after installation presents a problem for the longevity and effectiveness of a sewer system. Most materials experience some shrinkage after installation within an existing pipe. Once the pipe liner material has been installed, an annulus between the host pipe and the pipe liner is created due to this shrinkage of the material or due to surface irregularities of the main pipe. The amount of shrinkage by a pipe liner depends on the materials used, the thickness of the liner, the depth of the pipe, the ambient temperatures, as well as several other factors. This shrinkage allows water and debris to enter into the sewer system from the ground surrounding the pipes, allows sewage to escape into the ground surrounding the pipes, and allows roots from surrounding vegetation to enter the annulus between the host pipe and the pipe liner.

The problem of shrinkage of a cured-in-place pipe has been addressed previously in the art. U.S. Pat. Nos. 6,641,688 and 7,094,308 to Gerhart teach methods of sealing the annular space formed between existing sewer pipes and cured-in-place pipes. Gerhart discloses placing an unactivated sealant at points of future liner ports and causing the sealant to be activated to form an annulus gasket after installation of the liner through application of a curing means to the rehabilitative liner. Specifically, Gerhart teaches spraying an expandable material to an existing main pipe before the application of a cured-in-place liner at or near the future liner ports. Heat is then added to the material to expand the material while the cured-in-place liner is installed, filling the annular space. There are several problems with this method. First, the step of spraying the material onto the pipe may be time consuming and the sprayed-on material may fall off of the pipe or sag to the bottom of the pipe due to gravity. Secondly, there is no way of determining whether the expandable material has expanded sufficiently into the annular space during the curing process, as the liner obstructs the view of the annular space. Thirdly, the step of spraying the material onto the pipe is imprecise as there may be areas of the main pipe that receive too much or too little expandable material resulting in an uneven wall thickness. Lastly, the sprayed-on material may be moved by ground water leaking through cracks into the pipe. Therefore, there is a need in the art for an improved process and apparatus for sealing the annular space formed between existing sewer pipes and pipe liners.

In sewer systems where the main pipes have been rehabilitated with a cured-in-place pipe, unsealed connections at service and manhole junctions create problems. An unsealed connection is generally a product of installing a pipe liner within the main pipe, then using a cutting tool on the pipe liner at the connection to reinstate service. Current methods are described for example in U.S. Pat. Nos. 5,587,126; 6,641,688; and 7,131,791. Once service is reinstated to the service pipes by the use of the cutting tool, the service pipes may still include leaks, cracks or other structural defects that allow infiltration or exfiltration of fluids or sediment at or around the junction of the main and service pipe. The service pipe and junction with the main pipe may be further sealed or rehabilitated by installing a second pipe liner to seal the junction. Known methods of repairing and sealing the junction of a main and service pipe where the main pipe has been rehabilitated with a pipe liner include, for example U.S. Pat. Nos. 5,915,419; 6,068,725; and 6,651,699. The issue of repairing a junction of a main and service pipe has also been previously addressed in U.S. Pat. No. 6,994,118 and U.S. Pat. App. 2009/0056823, which are hereby incorporated by reference in their entireties. In these publications, a band or o-ring made of hydrophilic material is used to create a seal between a host pipe and a cured-in-place pipe liner at the junction between a main pipe and a lateral or service pipe.

Once the main pipe and the junctions of the main and service pipes have been rehabilitated and sealed, the manhole and the junction of the main pipe and the manhole (or "main pipe/manhole junction") remain at risk for allowing unwanted infiltration or exfiltration of fluids and sediment. Conventional manholes include a lower or bottom pan, a barrel with a diameter no greater than the adjacent pan, a concentric or eccentric cone extending upwardly from the barrel, one or more adjusting rings to adjust the overall height of the manhole, and a casting frame on top of the adjusting rings to support a lid at an elevation substantially level with the surrounding pavement. Manholes may be used for many purposes, including acting as catch basins for storm water drainage, providing access to buried pipelines, junction chambers at the intersection of sewer lines, and constructing reservoirs or wetwells for pump stations. As such, the manhole structure is a critical point to seal within the sewer system because it is an area that is inundated with fluids and sediment. The issue of sealing a manhole utilizing cured-in-place pipelining techniques has been previously addressed in U.S. Pat. No. 7,670,086 and U.S. Pat. App. 2010/0018631, which are hereby incorporated by reference in their entireties. However, unless the junction between the manhole and sewer pipe is properly sealed, ground water will continue to run along the main pipe until it can enter the sewer system where the main pipe joins the manhole.

There have also been attempts in the art to seal the junction of a manhole and a main pipe. For example, U.S. Pat. No. 5,879,501 discloses the use of a tubular form inserted into the main pipe at a manhole junction. The manhole is then sprayed with a cement or polymer, the tubular form is removed, and the main pipe is lined with a cured-in-place pipe. This method is time consuming, requires the use of a tubular member to act as a mold for the area around the junction, does not address the problem of annular space around the pipe liner, and does not create a fluid-tight seal around a substantial area of the main pipe/manhole junction. With such a method, it is unclear how to fully seal the junction of a manhole and a main pipe, as the shrinkage of the cured-in-place pipe will still allow ground water to infiltrate the annular space.

Additionally, there are deficiencies to other known methods of sealing pipe junctions when applied to the junction of a manhole and a pipe. For example, the use of a band or o-ring as taught by U.S. Pat. No. 6,994,118 and U.S. Pat. App. 2009/0056823 would result in imprecise placement within the host pipe, as the flexible o-ring or band may shift within the pipe or fall during placement of a pipe liner. Another example of material used to seal pipe junctions includes a hydrophilic rope. One sample of hydrophilic rope is a product sold under the trade name Waterstop-Rx® in the United States by the Cetco company. The use of such a rope to seal the junction of a manhole and a pipe would result in imprecise placement within the host pipe, as there are no structural elements allowing the flexible rope to remain in place. Furthermore, the use of such a rope would not provide a complete seal, because the rope would be unconnected at its ends, allowing water or other fluid to track along the edge of the rope and leak at the point where the ends abut.

Therefore, a need in the art exists for a new apparatus and method for effectively sealing the junction between a buried pipe, such as a sewer pipe, and a manhole.

SUMMARY OF THE INVENTION

It is therefore a primary object, feature, and/or advantage of the present invention to provide an improved apparatus and method for repairing the junction between a buried pipe and a manhole that overcomes deficiencies in the prior art.

It is another object, feature, and/or advantage of the present invention to provide a seal to both a portion of the interior of the buried pipe and the adjoining wall of the manhole.

It is another object, feature, and/or advantage of the present invention to provide an apparatus and method for repairing the junction between a pipe and a manhole which is economical to manufacture, easy to install, and durable in use.

It is another object, feature, and/or advantage of the present invention to provide an improved method and apparatus for repairing the junction of a pipe and a manhole that provides a compression seal to the majority of the area at the junction.

It is another object, feature, and/or advantage of the present invention to provide a tubular sleeve that is retained in the pipe by a mechanical fastener, where the tubular sleeve may be installed in a pipe with minimal movement during a pipe liner installation, and where the tubular sleeve is made in a controlled setting to have a specified and consistent wall thickness.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, an assembly for sealing a pipe at a manhole junction is provided. The assembly includes a tubular sleeve having an outer diameter approximately equal to a pipe diameter; a mechanical fastener; a pipe liner; and optionally a manhole liner. The sleeve is constructed with a hydrophilic material and has a hardness of preferably less than 90 Shore A Durometer Scale. In one embodiment, the hardness of the hydrophilic material may be such that the tubular sleeve is collapsible, but capable of being placed back into an initial tubular conformation. The tubular sleeve may include a flange attached to at least a portion of an end of the tubular sleeve.

According to another aspect of the present invention, a method for using the assembly to seal a pipe at a manhole junction is provided. The method includes providing the assembly for sealing a pipe having a manhole junction and placing the tubular sleeve within the pipe, where a proximal end of the tubular sleeve is aligned with the junction of the pipe and the manhole. The pipe liner is placed against the inner wall of the tubular sleeve. Optionally, a manhole liner is placed against the walls of the manhole, creating a seal at the junction of the manhole and the pipe.

BRIEF DESCRIPTION OF THE DRAWINGS

FIG. 4 is a sectional view of a sewer system including a manhole, main pipe, and service pipes illustrating where the tubular sleeve of FIG. 1 is placed into the main pipe.

DETAILED DESCRIPTION OF EMBODIMENTS

The present invention relates to an apparatus and method for repairing the junction between a manhole and a buried pipe in fluid communication with the manhole, such as underground sewer pipe and the like. The end of a pipe adjoining a manhole is sealed with the use of a pipe liner and a tubular sleeve made of a hydrophilic material. Alternatively, a majority of the area surrounding a junction of a pipe and a manhole is sealed by the use of a flange portion attached to the tubular sleeve made of a hydrophilic material and a manhole liner.

The following definitions of terms are employed throughout the specification and claims:

A "pipe liner" is defined as a material that is used to provide a lining to a pipe. Pipe liners include but are not limited to cured-in-place pipe liners, folded liners, or spray-on liners.

A "cured-in-place pipe liner" is a fabric capable of holding a resinous material.

A "folded liner" is a material constructed of a thermoplastic, such as High Pressure Polyethylene ("HPPE"), High Density Polyethylene ("HDPE"), Medium Density Polyethylene ("MDPE"), Polyvinyl Chloride ("PVC"), and/or modified PVC that is used to provide a lining to pipes.

A "main liner" or "main pipe liner" is defined as a pipe liner for use inside of a main sewer pipe.

A "manhole liner" is defined as a material that is used to provide a lining to a manhole. Manhole liners include but are not limited to cured-in-place manhole liners, spray-on manhole liners, cementitious manhole liners, cast-in-place manhole liners, and resin manhole liners.

A "cured-in-place manhole liner" is a fabric capable of holding a resinous material.

A "spray-on liner" is defined as a material that is used to provide a lining to a manhole or pipe where the material is sprayed onto the walls of the manhole or pipe.

A "cementitious liner" is defined as a cement material that is used to provide a lining to a manhole. Cementitious liners may usually be sprayed, spread, or otherwise placed onto the walls of the manhole.

A "resin liner" is defined as a resinous material that is used to provide a lining to a manhole. Resin liners may be sprayed, spread, or otherwise placed onto the walls of the manhole.

A "service pipe" is defined as a pipe that is lateral to a main pipe.

Figure 1:
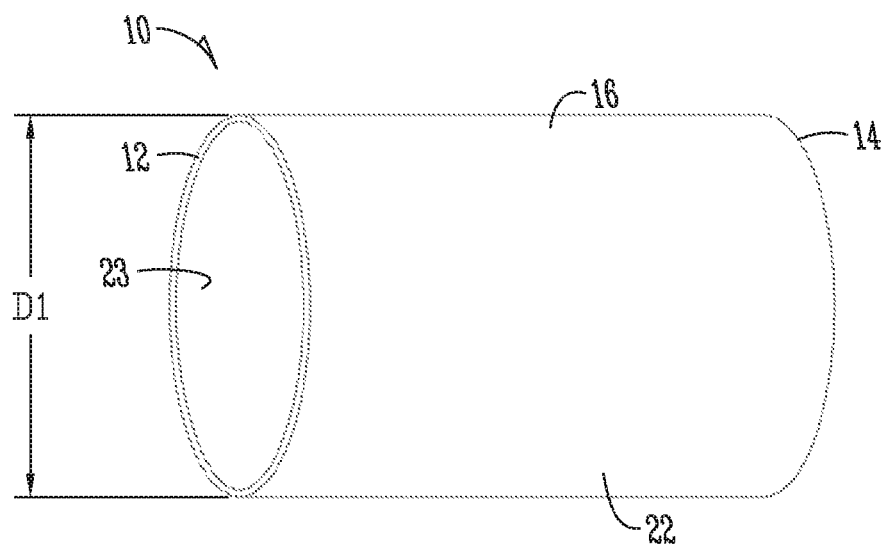
FIG. 1 is a perspective view of a tubular sleeve in accordance with a first embodiment of the present invention.

Referring now to the figures wherein like numerals refer to like parts, FIG. 1 is a perspective view of a tubular sleeve 10 in accordance with an embodiment of the present invention. The tubular sleeve 10 comprises a proximal end 12, a distal end 14, a body 16 there between, and an outer wall 22 having a diameter D1. The tubular sleeve 10 is a single, unitary piece that may be made by vulcanization processes. Such methods may include wrapping or extruding polymeric material around a mandrel and placing the loaded mandrel into a vulcanizing autoclave for a predetermined period of time. A vulcanization method is preferred for the tubular sleeve 10, because the material may be formed in a tube of considerable length to be cut into shorter tubular sleeves. Such a method would decrease the cost of producing the tubular sleeve 10 compared to other methods, allowing for the simultaneous production of a plurality of units. Other methods of forming the tubular sleeve 10 include casting or molding methods, including but not limited to resin casting, injection molding, blow molding, or extrusion molding. The tubular sleeve 10 may be produced in units of preferably 1-8 inches and most preferred 5-7 inches in length. The tubular sleeve 10 should be less than about 10 mm in thickness, with 2-3 mm most preferred. The tubular sleeve 10 is preferably produced in the form of a tube. However, it should also be appreciated that alternative constructions are possible, such as where a sheet of material is formed into a tube and fused together by thermal bonding, adhesives, or other mechanical bonding methods. It should also be noted that the tubular sleeve 10 may be formed by taking a sheet of material and forming it into a tube by overlapping the ends, and then securing the tubular form within the pipe by the use of mechanical fasteners. Therefore, a bonded, continuous tube is not required to practice this invention. However, the body 16 preferably comprises a generally uniform wall thickness along the length of the tubular sleeve.

Tubular sleeve 10 may be made of a compliant material, including but not limited to rubber, polyurethane, or other polymers. Tubular sleeve 10 is made of or impregnated with a material having hydrophilic properties, such that the material will swell in the presence of water. Such a material is preferred when the junction to be sealed experiences or is at risk of experiencing water infiltration, as the hydrophilic material will expand in the presence of water and extrude through voids or cracks in the passageway, thus creating a full compression seal. For examples of hydrophilic materials for use as seals, see U.S. Pat. No. 6,328,310, 6,541,106, or 6,994,118.

A feature of the tubular sleeve 10 is that the material comprising the tubular sleeve may be of such a hardness that the tubular sleeve should be able to maintain its tubular shape within a conduit, such as a main pipe. The material of the tubular sleeve of the present invention may have a hardness between 0 Shore A Durometer Scale and 80 Shore D Durometer Scale. It is preferred that the tubular sleeve has a hardness of less than 90 Shore A Durometer Scale. Another feature of the sleeve 10 is that outer diameter D1 is approximately equal to a diameter of a buried pipe in fluid communication with a manhole, such as underground sewer pipe or the like. The tubular sleeve may be retained within the pipe by utilizing a mechanical fastener before a pipe liner is placed against the walls of the pipe.

Figure 2:
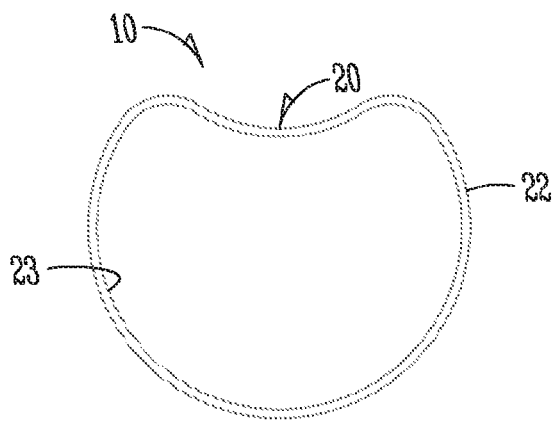
FIG. 2 is a sectional view of the tubular sleeve of FIG. 1 while placed in a strained conformation.

The tubular sleeve 10 may have the properties of an elastomeric material, having the ability to undergo deformation under the influence of a force and regain its original shape once the force has been removed. As such, the tubular sleeve 10 may be deformed from an initial tubular conformation to a strained conformation. In the strained conformation, the outer profile of the tubular sleeve is reduced to fit into a pipe. As shown in FIG. 2, a force may act on the sleeve such that the body is folded over itself to reduce the outer diameter D1 of the sleeve. Once the tubular sleeve is placed into the pipe, the elastomeric material is allowed to return to its initial tubular conformation. Since the outer diameter D1 of the tubular sleeve 10 is approximately equal to a diameter of the pipe, the tubular sleeve will sit within the pipe. A mechanical fastener may be placed on the interior of the tubular sleeve 10 to press or secure it against the interior of the pipe, to avoid the need for an operator to hold the tubular sleeve 10 in place during installation of a pipe liner.

The illustrated embodiments as described include where the buried pipe is in fluid communication with the manhole is a main pipe. However, any other pipe in communication with the manhole, such as a lateral pipe (not shown), is within the scope of this invention. The illustrated embodiments further show where the pipe liner and manhole liner are cured-in-place liners. However, it should be understood that any other type of pipe liner or manhole liner is within the scope of this invention. For example, the pipe liner may be a cured-in-place liner, a folded liner, or a spray-on liner. The manhole liner may be a cured-in-place manhole liner, a spray-on manhole liner, a cementitious manhole liner, a cast-in-place manhole liner, and/or a resin manhole liner.

FIG. 2 is a sectional view of the tubular sleeve of the first embodiment of the present invention while placed in a strained conformation. In the strained conformation, the sleeve 10 includes a strained portion 20 along the length of the tubular sleeve that allows the outer profile of the tubular sleeve 10 to be reduced, allowing an easier insertion of the sleeve 10 into the pipe.

Figure 3A:
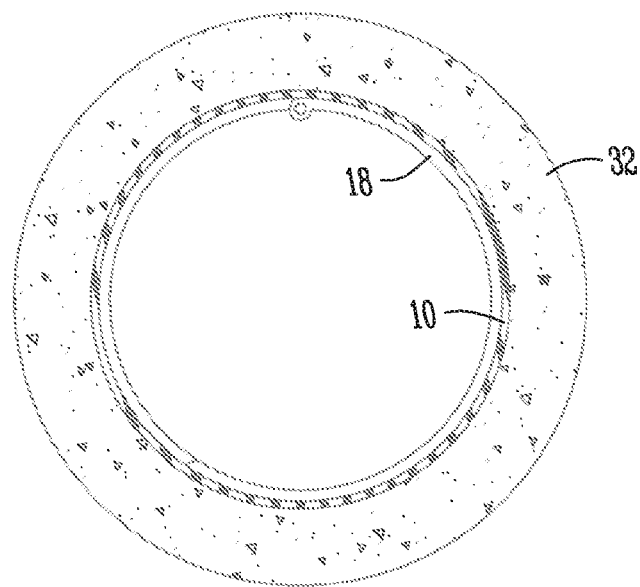
FIG. 3A is a cross-sectional view of a pipe illustrating the tubular sleeve of FIG. 1 placed inside of a pipe, where a mechanical fastener is utilized to secure the sleeve in the pipe.

FIG. 3A is a cross-sectional view of a pipe showing the tubular sleeve 10 within a pipe 32, where a mechanical fastener 18 placed against the inner wall 23 of the tubular sleeve 10 is holding the sleeve in place. The mechanical fastener 18 should be capable of radially expanding and holding the tubular sleeve 10 against the pipe 32. In one embodiment, the mechanical fastener may generally be a retaining ring. The retaining ring may be a piece of flat metal formed into a generally circular shape having its ends held together with a pin. An operator may place the tubular sleeve 10 within the pipe 32, place the mechanical fastener 18 within the tubular sleeve 10, and remove the pin. Removal of the pin will allow the mechanical fastener 18 to radially expand against the inner wall of the tubular sleeve 10, pressing the outer wall of the tubular sleeve against the inner wall of the pipe 32. As such, the retaining ring may have an expanded or final diameter similar to the host pipe. Alternatively, such a retaining may be constructed of a shape memory alloy or metal and fabricated to have an initial diameter roughly equivalent to the pipe diameter. The shape memory allow may be deformed under pressure to fit a smaller diameter, placed within the tubular sleeve, and allowed to return to its initial pre-stressed conformation, holding the tubular sleeve in place against the pipe. Any other mechanical fastener capable of holding the tubular sleeve 10 in place is contemplated for use with this invention. For example, a ratcheting ring, a hose clamp, a hydraulic ring, or any other retaining ring that keeps the tubular sleeve 10 in an open state within the pipe 32 may be utilized. Other mechanical fasteners that may be used include screws, nails, or anchors. It should be noted that the mechanical fasteners contemplated for use with this invention should be constructed of a rust-resistant material or a material that has been treated with a rust/oxidation inhibitor. It should also be noted that if the mechanical fastener or retaining ring includes a portion that protrudes into the pipe (such as a worm gear or screw), the area of protrusion should be oriented so that pipe flow is not obstructed (as shown in FIG. 3A). Such an orientation may generally be described as near the top of the pipe interior.

Figure 3B:
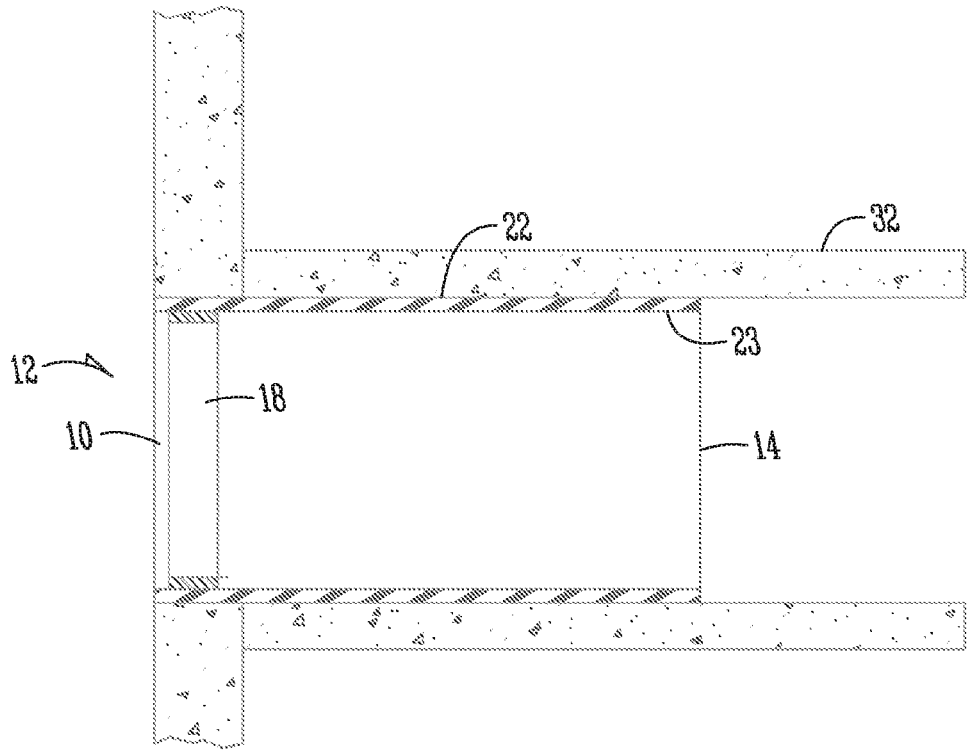
FIG. 3B is a sectional view of the tubular sleeve and mechanical fastener of FIG. 3A within a pipe.

FIG. 3B is a sectional view of the tubular sleeve 10 and mechanical fastener 18 of FIG. 3A within a pipe 32. FIG. 3B shows the use of a circular, cylinder shaped mechanical fastener 18 placed near an end of the tubular sleeve 10. While the length of the mechanical fastener is shown to be substantially less than the length of the tubular sleeve 10, it should be appreciated that the length of the fastener 18 could be the same or even longer than the length of the sleeve 10. In addition, it should be noted that when using a fastener such as shown in FIG. 3B, it should be of minimal thickness to avoid creating blockage. The thickness of the mechanical fastener 18 in this and all the figures is exaggerated to show placement and structure of the component. In FIG. 3B, the thin mechanical fastener 18 is placed near the proximal end 12 of the tubular sleeve 10. In this embodiment, the mechanical fastener 18 is placed at the proximal end 12 because the pipe liner to be installed within the pipe will invert through the pipe through the proximal end 12 of the tubular sleeve 10 toward the distal end 14. Therefore, a major role of the mechanical fastener 18 is to ensure that the pipe liner easily aligns with and travels through the tubular sleeve 10 during installation. If the mechanical fastener 18 is not used, the tubular sleeve may sag or move within the pipe during a pipe liner installation, resulting in misplacement of the tubular sleeve within the pipe. As such, it may be said that the mechanical fastener is placed near the leading end of the tubular sleeve 10. The leading end of the tubular sleeve is generally the end that first receives the pipe liner. However, as mentioned above, it is contemplated that the mechanical fastener 18 be the same length or longer than the length of the tubular sleeve 10. In these circumstances, the location of the mechanical fastener 18 does not matter. It is also contemplate that two mechanical fasteners 18 be utilized, with one at the proximal end 12 and the other at the distal end 14 of the tubular sleeve 10.

FIG. 4 is a sectional view of a sewer system including a manhole 30, main pipe 32, service pipes 34, a main pipe/manhole junction 36, and a main/service junction 38. FIG. 4 illustrates where the tubular sleeve 10 is deformed into the strained conformation as depicted in FIG. 2, and placed into the main pipe 32 such that the proximal end 12 of the tubular sleeve 10 is adjacent the main pipe/manhole junction 36. Additionally, mechanical fastener 18 is shown near distal end 14 of tubular sleeve 10. After the tubular sleeve 10 is placed into the main pipe 32, the tubular sleeve 10 is allowed to expand back into its initial tubular conformation. The elasticity of the sleeve 10 will cause the sleeve to revert from the strained conformation to the initial tubular conformation to fit the sleeve 10 against the wall of the main pipe 32. The tubular sleeve 10 may be secured against the wall of the main pipe 32 using the mechanical fastener 18. In certain embodiments, the sleeve 10 comprises a thin material (<10 mm) and has an outer diameter D1 substantially identical to the diameter of the main pipe. As such, the tubular sleeve 10 allows for a liner to line the main pipe 32 without creating significant gaps or protrusions in the main pipe.

Figure 5:
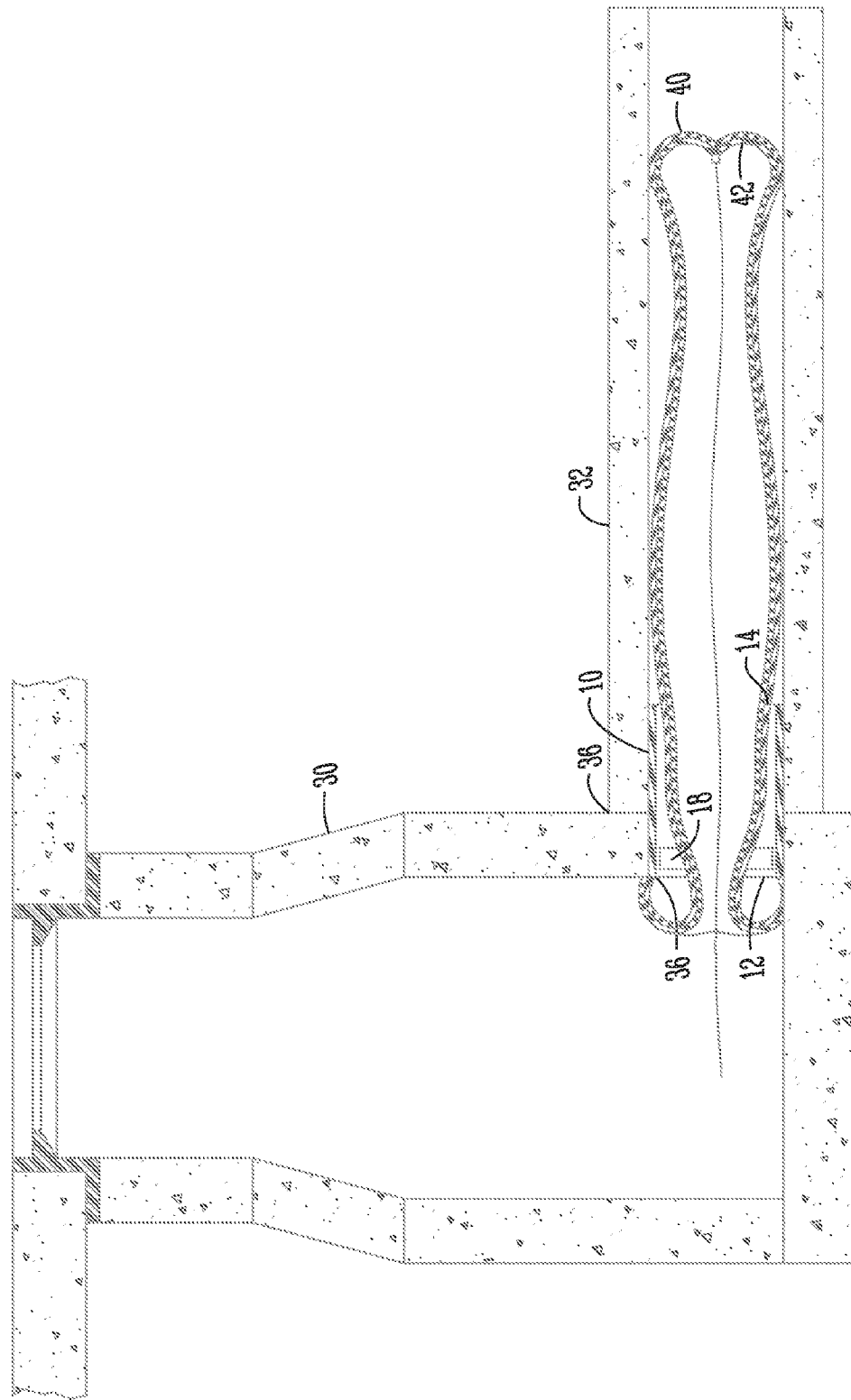
FIG. 5 is a perspective sectional view similar to FIG. 4, showing where a main liner is placed against the inner wall of the tubular sleeve and against the walls of the main pipe by the use of an inflatable bladder.

FIG. 5 is a view similar to FIG. 4 showing a main liner 40 placed against the inner wall of the tubular sleeve 10 and against the walls of the main pipe 32 using mechanical fastener 18. After the tubular sleeve 10 is placed into the main pipe 32, a cured-in-place main liner 40, impregnated with a resinous material capable of curing and hardening, is inserted through the tubular sleeve 10 and against the sleeve and the walls of the main pipe 32. As shown in FIG. 5, the main liner 40 is pressed against the wall of the main pipe 32 and the inner wall of the tubular sleeve 10 by the use of an inflatable bladder 42. There are several methods that may be employed to use the inflatable bladder 42. The inflatable bladder 42 may be inverted into the main pipe 32 after the main liner 40 is already within the main pipe 32; the inflatable bladder 42 may be inverted into the main pipe 32 along with the main liner 40; or the inflatable bladder 42 may be may be pulled into place by an operator and subsequently inflated by air or another fluid. Alternatively, the main liner 40 may have a fluid-impermeable coating on one side, allowing the main liner 40 to inflate without the use of a bladder.

Figure 6:
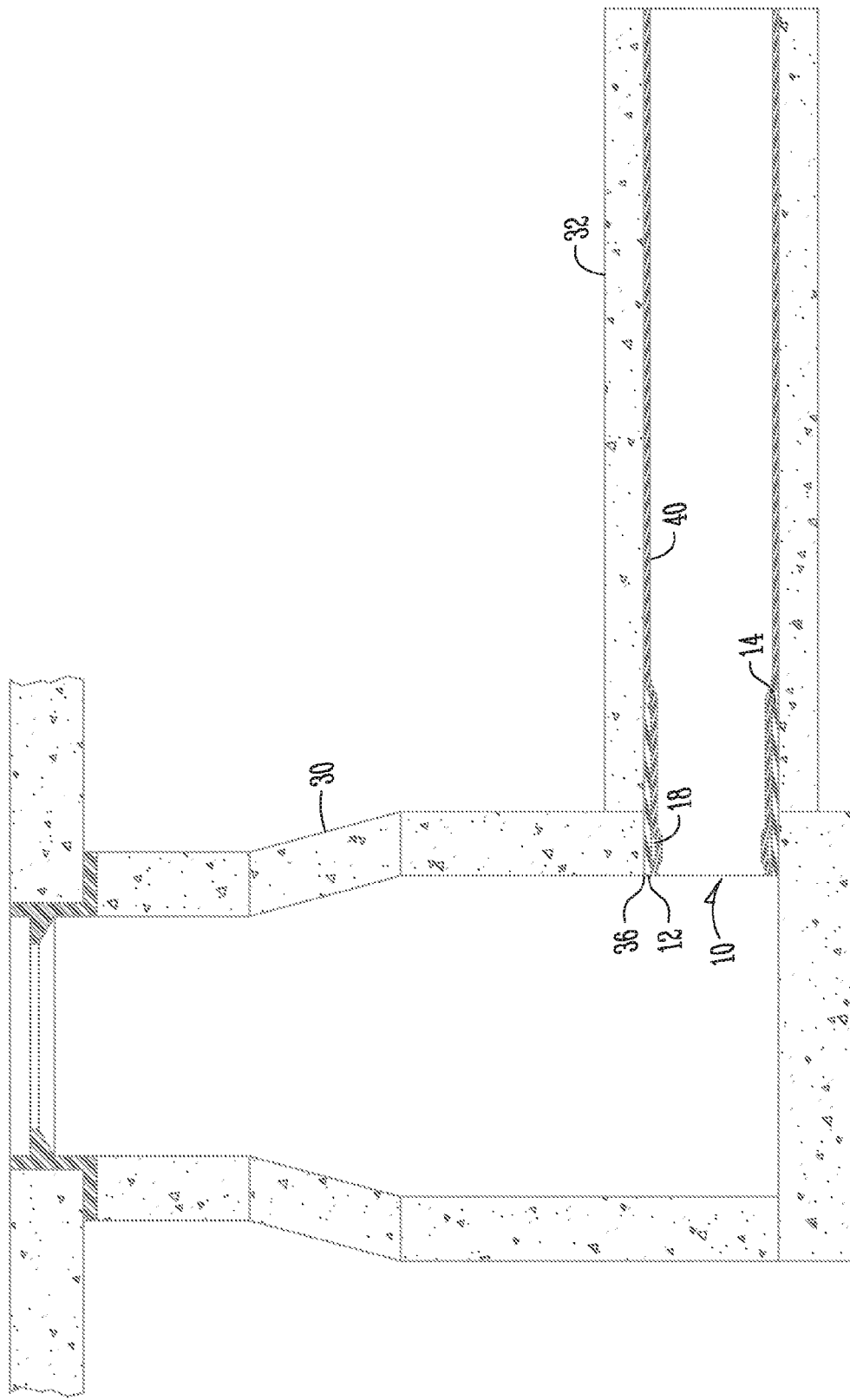
FIG. 6 is a view similar to FIG. 4 where the liner has cured.

FIG. 6 is a view similar to FIG. 5, showing the pipe system after the main liner 40 has cured. After the main liner 40 is pressed against the walls of the main pipe 32, the resinous material is allowed to cure and harden, holding the tubular sleeve 10 in place between the main liner 40 and the main pipe 32. Even if the end of the main liner near the manhole were to shrink, the tubular sleeve 10 acts to fill the annular space between the main liner 40 and the main pipe 32. Since features of embodiment include using a hydrophilic material for the tubular sleeve, the hydrophilic material of the tubular sleeve 10 will expand in the presence of water and/or extrude through voids or cracks in the main pipe 32, thus creating a full compression seal in the annular space between the main liner 40 and the main pipe/manhole junction 36.

In operation, the tubular sleeve 10 works as follows. An assembly is provided, comprising a tubular sleeve 10 having a proximal end 12 and an outer diameter D1 approximately equal to a main pipe diameter; a mechanical fastener 18; and a main liner 40 impregnated with a resinous material capable of curing and hardening. The tubular sleeve 10 is constructed of a hydrophilic elastomeric material having a hardness between 0 Shore A Durometer Scale and 80 Shore D Durometer Scale. However, it is preferred that the tubular sleeve has a hardness of less than 90 Shore A Durometer scale. The tubular sleeve is placed into a strained, possibly non-tubular conformation so that the outer profile of the sleeve is reduced to fit inside of a main pipe. The sleeve is placed into a main pipe such that the proximal end 12 of the sleeve 10 is adjacent a junction 32 of a manhole 30 and a main pipe 32. Once placed within the main pipe, the sleeve is allowed to expand back into its initial tubular conformation. The tubular sleeve may have a relatively tight fit within the pipe, as the outer diameter of the tubular sleeve should have an outer profile that matches the inner profile of the pipe once placed against the pipe wall. An operator then secures the tubular sleeve 10 against the wall of the main pipe 32 using the mechanical fastener 18. The main liner 40 is then inserted into the main pipe and through at least a portion of the tubular sleeve. The main liner is pressed against the inner wall of the tubular sleeve, and the resinous material is allowed to cure and harden. In situations where the main liner has cured against the wall of the main pipe, the main liner may be cut with a saw or the like at the junctions with service pipes in order to reinstate service to the main pipe.

Usually within about 48 hours after curing the main liner, a manhole liner 150 (see FIGS. 9 and 10) impregnated with a resinous material capable of curing and hardening may be placed into the manhole adjacent the main pipe. The manhole liner is pressed against the walls of the manhole and the resinous material is allowed to cure and harden. The cured manhole liner is cut with a saw or the like around the junctions with other pipes, such as main pipes, to reinstate service to the manhole. Alternatively, other manhole liners may be utilized as stated above. After installation of the tubular sleeve, the main liner, and optionally the manhole liner, water will enter the annular space between the liners and the main pipe and/or manhole. Since the tubular sleeve is constructed of a hydrophilic material, the material will expand and/or swell upon contact with water, making a compression seal and extruding through voids or cracks in the main pipe and/or manhole.

Once this process is complete, there may still be infiltration of water and sediment between the manhole liner and the walls of the manhole, entering from the top of the manhole where the lid sits (or manhole "casting"). Therefore, the assembly may further include a second tubular sleeve 160 (see FIGS. 8-10) having an outer diameter approximately equal to a manhole casting 131 diameter. In such a case, the second tubular sleeve 160 is placed into the manhole casting 131 before placement of the manhole liner 150. The second tubular sleeve 160 is placed within the manhole casting. A second mechanical fastener or retaining ring 162 may be placed on the inner wall of the second tubular sleeve 160 to secure it to the manhole casting 131. The manhole liner is placed against an inner wall of the tubular sleeve. The resinous material in the manhole liner is allowed to cure and harden, and any infiltration from the manhole casting is then staunched by the tubular sleeve placed between the manhole liner and manhole casting.

In such a system, an advantage of using a second tubular sleeve made of hydrophilic material at the manhole casting is that the tubular sleeve will provide a cushion to the cured manhole liner for freeze-thaw cycles, as the manhole casting is susceptible to expansion and contraction due to the elements. The primary advantage of using a second tubular sleeve is that most points of water and sediment infiltration/exfiltration are sealed using the hydrophilic material. However, another point of water and sediment infiltration/exfiltration within the sewer system is the junctions of main and service pipes. As such, the assembly may further include a service liner to seal the service pipes. The use of a second tubular sleeve for the manhole casting and a service liner is optionally considered for use with all embodiments of the present invention.

Figure 7:
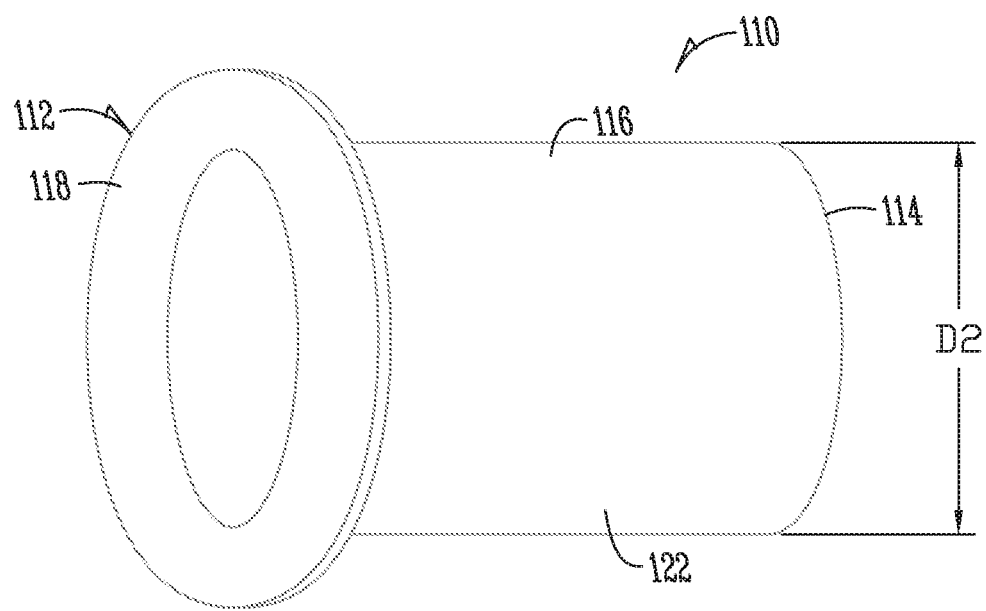
FIG. 7 is a perspective view of a tubular sleeve in accordance with a second embodiment of the present invention where at least a portion of the proximal end of the tubular sleeve includes a flange portion.

FIG. 7 is a perspective view of a tubular sleeve 110 in accordance with an additional embodiment of the present invention. Tubular sleeve 110 comprises a proximal end 112, a distal end 114, a body 116 there between, an outer wall 122 having a diameter D2, and a flange portion 118. As in the tubular sleeve 10 of FIGS. 1-6, the tubular sleeve 110 is a single, unitary piece that is made by a vulcanization, casting, or molding method, including but not limited to resin casting, injection molding, blow molding, or extrusion molding. The tubular sleeve 110 may be molded directly into the form of a tube with a flange portion. However, alternative constructions are possible where the tube may be formed by taking a sheet of material and forming it into a tube, then fusing the material into a tube and attaching a flange portion by thermal bonding, adhesives, or other mechanical bonding methods. The body 116 and flange portion 118 comprise a generally uniform wall thickness along their respective lengths. The outer diameter D2 of the tubular sleeve 110 is approximately equal to a diameter of a pipe for which the tubular sleeve 110 is to be inserted.

In the tubular sleeve 110 shown in FIG. 7, the flange portion 118 surrounds the entire periphery of the proximal end 112 of the tubular sleeve 110. However, alternative constructions are possible, as the flange portion 118 may extend around a portion of the tubular sleeve 110. The flange portion 118 acts to provide a seal to the majority of the area of a main pipe/manhole junction, providing a seal to the portion of the manhole adjacent the main pipe. The amount of flange portion 118 present on the tubular sleeve will depend on the construction of the junction of the manhole and main pipe. For instance, some main pipes are situated above the floor of the manhole, which is called a drop inlet. A drop inlet is depicted in FIGS. 7-10. Other main pipes are situated at the floor of the manhole, and a bench is added onto the manhole floor making a trench, allowing the contents of the main pipe to pass through the manhole in the area between the bench. For instances where the manhole utilizes a bench in the manhole floor, the flange portion 118 should surround the periphery of the tubular sleeve 118 such that the flange portion contacts the wall of the manhole adjacent the main pipe. It is possible to construct a tubular sleeve 110 such that a portion of the periphery of the distal end 112 includes a flange portion 118 by molding the tubular sleeve 110 as such. It is preferred to produce a tubular sleeve 110 where the flange portion 118 extends around the entire periphery of the proximal end 112, so that an installer may simply cut away a section of flange portion 118 with a knife, saw, or the like to tailor the tubular sleeve 110 to a specific main pipe/manhole junction.

Figure 8:
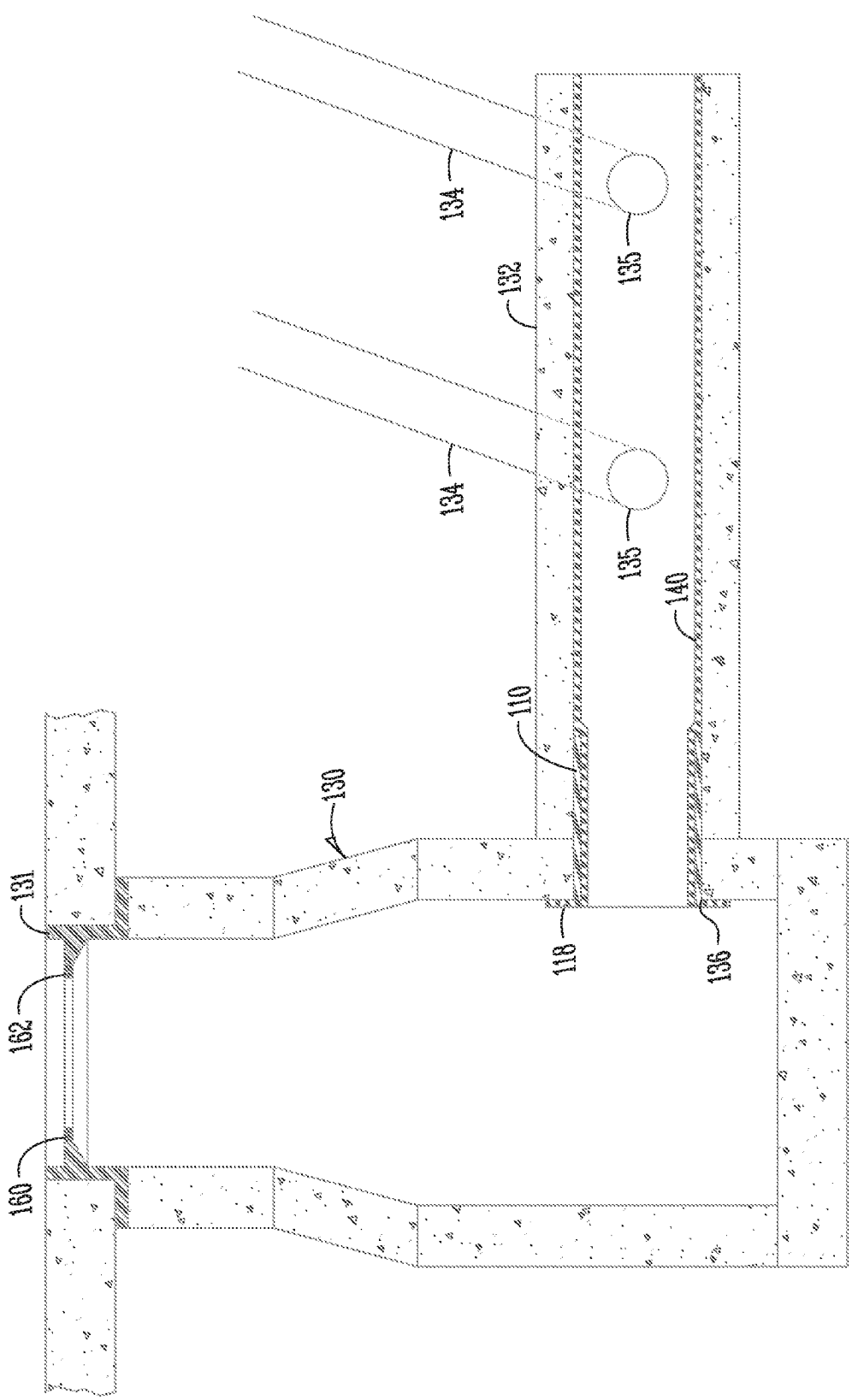
FIG. 8 is a sectional view of a sewer system including a manhole, main pipe, and service pipes illustrating where the tubular sleeve of FIG. 6 is placed into the main pipe, where a liner has been placed against the walls of the tubular sleeve and the main pipe, and where the flange portion of the tubular sleeve abuts the wall of the manhole. Additionally, an optional second tubular sleeve is placed between the manhole casting and the manhole liner.

FIG. 8 is a perspective sectional view of a sewer system including a manhole 130, main pipe 132, and service pipe 134 illustrating where the tubular sleeve 110 is placed into the main pipe 132. FIG. 8 also shows that a main liner 140 has been cured against the wall of the tubular sleeve 110 and the main pipe 132, and that the flange portion 118 of the tubular sleeve 110 abuts the wall of the manhole 130. As discussed above in regards to FIGS. 1-6, the tubular sleeve 110 may be placed into a strained conformation and placed into the main pipe 132 such that the proximal end 112 of the tubular sleeve 110 is adjacent the main pipe/manhole junction 136. After the tubular sleeve 110 is placed into the main pipe 132, the tubular sleeve 110 is allowed to expand to its initial tubular conformation. A mechanical fastener or retaining ring may be placed on the inner wall of the tubular sleeve 110 to secure it to the main pipe 132 such as described above regarding FIGS. 3-6. Then a main liner 140, impregnated with a resinous material capable of curing and hardening, is inserted into the main pipe 132 and pressed against the walls of the tubular sleeve 110. The main liner 140 is then cured-in-place with or without the use of an inflatable bladder.

Figure 9:
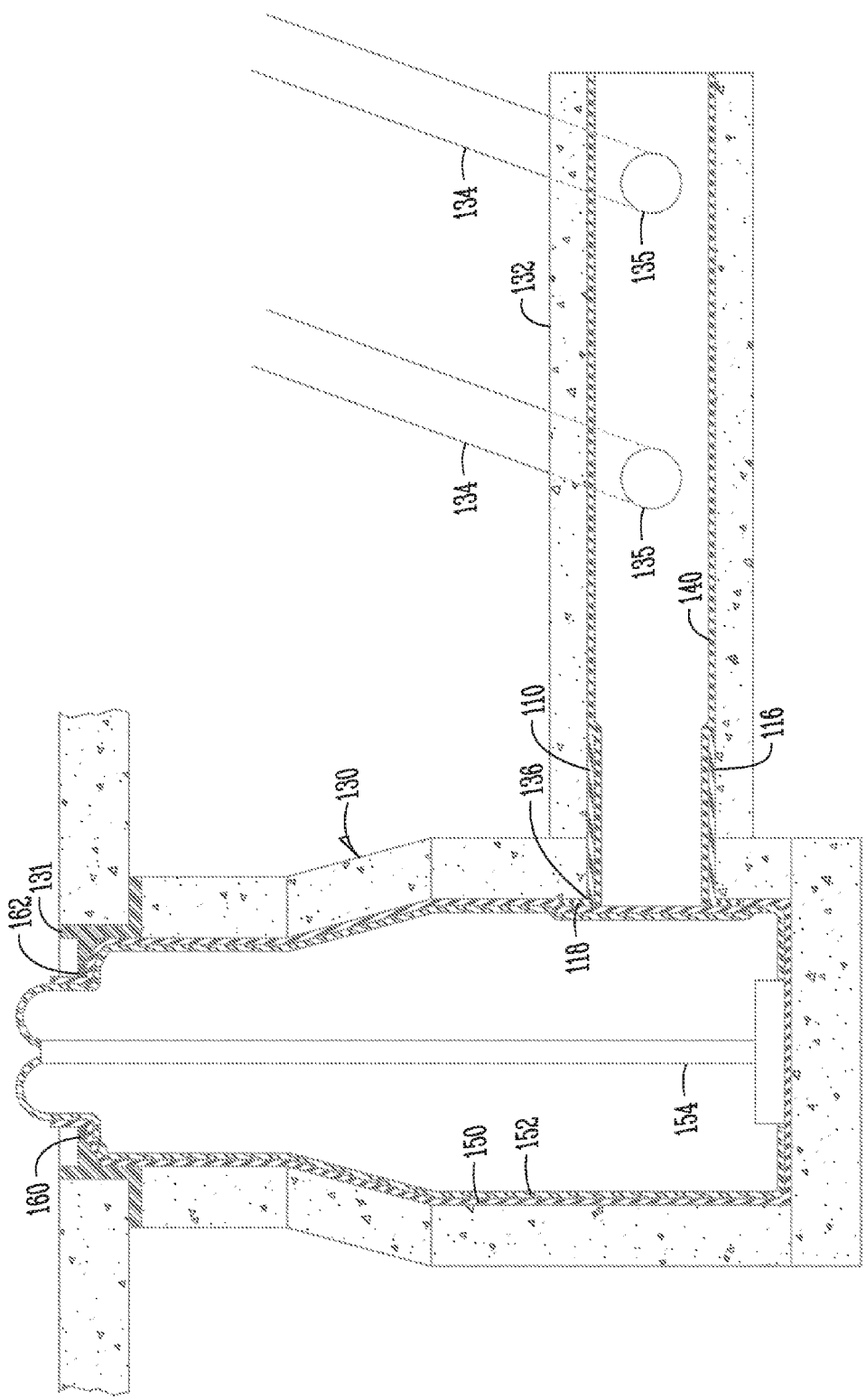
FIG. 9 is a view similar to FIG. 7, showing where a manhole liner is placed against the walls of the manhole and against the flange portion of the tubular sleeve.

FIG. 9 is a view similar to FIG. 8, showing a manhole liner 150 impregnated with a resinous material capable of curing and hardening inserted into the manhole 130 and pressed against the wall of the manhole 130 as well as against the flange portion 118 of the tubular sleeve 110. Once the main liner 140 has been installed, it is advantageous to install a manhole liner 150 usually within 48 hours of placing the main liner 140 into the main pipe. The time frame to install the manhole liner 150 is noted because the hydrophilic material used for the tubular sleeve 110 will begin to swell at some point after placement within the main pipe 132. It is preferred to install the main liner 140 and manhole liner 150 over the tubular sleeve before it has begun to swell, which is usually within 48 hours. However, longer time periods are within the scope of this invention, depending on the hydrophilicity of the material used for tubular sleeve 110. The liners provide counter pressure to the tubular sleeve 110, allowing the material of the sleeve to provide a compression seal to the main pipe 132 and walls of the manhole 130.

The manhole liner 150 of FIG. 9 is shown pressed against the wall of the manhole 130 by an inflatable manhole bladder 152. The manhole bladder 152 is inflated by inflation device 154, and the resinous material is allowed to cure and harden. The inflation device 154 and inflatable manhole bladder 152 are removed from the manhole, and service to the pipes in the manhole 130 is reinstated by the use of a saw or other cutting tool.

Figure 10:
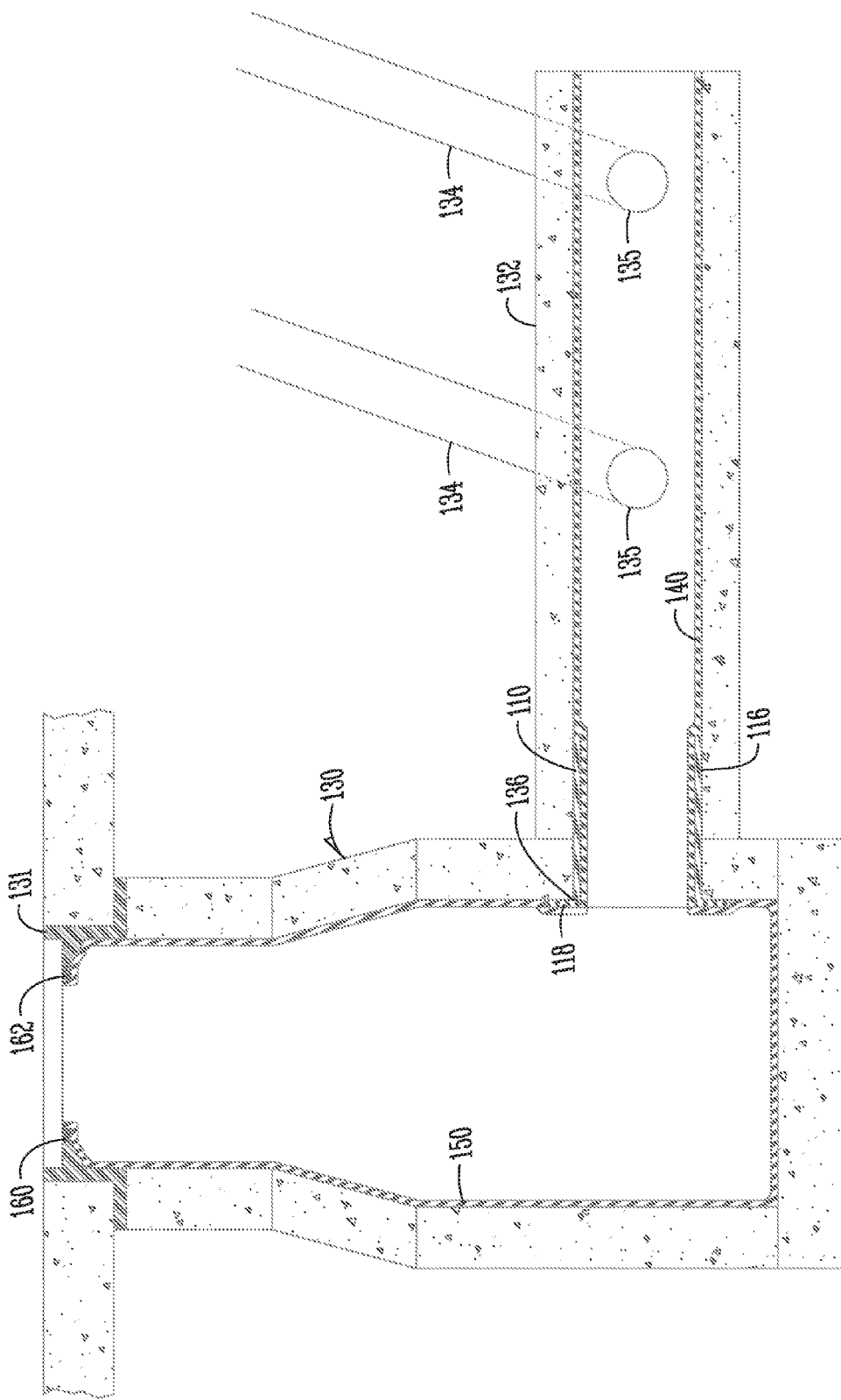
FIG. 10 is a sectional view of the junction of a main pipe and a manhole where the main liner and manhole liner have been installed in conjunction with the tubular sleeve of FIG. 6.

FIG. 10 is a sectional view of the main pipe/manhole junction 136 where the main liner 140 and manhole liner 150 have been installed in conjunction with the tubular sleeve 110. The figure shows that the manhole liner 150 comes into contact with the main liner 140 at the main pipe/manhole junction 136, with the body 116 of the tubular sleeve 110 against the wall of the main pipe 132 and the flange portion 118 against the wall of the manhole 130.

In operation, the tubular sleeve 110 is used as follows. An assembly is provided. The assembly comprises a tubular sleeve having a flange portion, a proximal end, a distal end, a body between the ends, and an outer diameter approximately equal to a main pipe diameter; and a main liner impregnated with a resinous material capable of curing and hardening. The tubular sleeve is constructed of a hydrophilic material having a hardness between 0 Shore A Durometer Scale and 80 Shore D Durometer Scale. However, it is preferred that the tubular sleeve has a hardness of less than 90 Shore A Durometer Scale. The distal end of the tubular sleeve is deformed to a strained, non-tubular conformation so that the outer profile of the body of the sleeve is reduced to fit inside the main pipe. The tubular sleeve is placed into a main pipe such that the proximal end of the tubular sleeve is adjacent a junction of a manhole and a main pipe and the flange portion abuts the wall of the manhole. Once placed within the main pipe, the body of the elastic tubular sleeve is allowed to revert and expand to its initial tubular conformation. The tubular sleeve may then be secured to the pipe using a mechanical fastener on the inner wall or an adhesive on the outer wall of the tubular sleeve. The tubular sleeve should have a relatively tight fit within the pipe. The main liner is then placed into the main pipe through the tubular sleeve. The main liner is pressed against the inner wall of the tubular sleeve, and the resinous material is allowed to cure and harden. In situations where the main liner has cured against the walls of the main pipe to cover openings of service pipes, the main liner may be cut with a saw or the like at the junctions with service pipes in order to reinstate service to the main pipe.

Within 48 hours after curing the main liner, a manhole liner impregnated with a resinous material capable of curing and hardening is placed into the manhole adjacent the main pipe. The manhole liner is pressed against the wall of the manhole and the flange portion of the tubular sleeve, and the resinous material is allowed to cure and harden. The cured manhole liner is cut with a saw or the like around the junctions with other pipes to reinstate service to the manhole. After installation of the tubular sleeve, main liner, and manhole liner, water will enter the annular space between the liners, the main pipe, and the manhole. Since the tubular sleeve is constructed of a hydrophilic material, the material will expand and/or swell upon contact with water, extruding through voids or cracks in the main pipe and manhole to seal the junction between a manhole and a main pipe.

Another embodiment of the invention (not shown) provides a tubular sleeve with a relatively low hardness. In this embodiment, the hardness of the material comprising the tubular sleeve is less than 90 Shore A Durometer Scale. This allows the material to act as an adjunct to the main liner during installation. As such, the tubular sleeve may be constructed to be much longer than the first two embodiments, as it may be designed to run the length of the main liner, up to 500 feet in length. This embodiment may therefore be used to seal two main pipe/manhole junctions, as it may run from a first manhole to a second manhole within the sewer system. The outer diameter of this embodiment of the tubular sleeve may be considerably less that the diameter of the main pipe, as the softer material will stretch when used with a main liner. Other than those stated differences, the tubular sleeve should be otherwise similar to the previous embodiments, utilizing a similar thickness, material, and construction method.

In the third embodiment, a tubular sleeve having a proximal end and a hardness less than 90 Shore A Durometer Scale rests within a pipe such that an end of the sleeve is adjacent a junction of the manhole and the pipe. An operator, machine, or robot places a pipe liner within the tubular sleeve. The pipe liner is preferably a cured-in-place liner, but other pipe liners are considered for use as well. The pipe liner is inflated or otherwise pushed or expanded toward the wall of the pipe, forcing the tubular sleeve toward the wall of the pipe. If a cured-in-place pipe liner is used, a resinous material impregnated in the pipe liner is then allowed to cure and harden. The installed pipe liner and tubular sleeve may then be cut with a saw or the like around the junctions with service pipes to reinstate service to the pipe. As in the previous embodiments, a manhole liner may be placed into the manhole adjacent the main pipe and altered to reinstate service.

An optional feature of the embodiments of the present invention includes adding an adhesive to the outer wall of the tubular sleeve. The adhesive may cover at least a portion of the outer wall, to assist in holding the tubular sleeve within the main pipe. Types of adhesives for use with the present invention include but are not limited to pressure-sensitive adhesives, double-sided tapes, or adhesive foams. It is preferred to include a paper or polymeric backing onto the adhesive, so that an installer may quickly peel the backing, insert the tubular sleeve into the pipe, and press the adhesive against the pipe or casting. It should also be noted that the tubular sleeve may be secured to the main pipe/manhole junction by including the adhesive on the flange portion of the tubular sleeve that abuts the wall of the manhole.

The present invention has many attendant advantages. First, the present invention provides a solution to the problem of shrinkage of cured-in-place pipe liners or other pipe liners creating annular space between the liner and the host pipe. Secondly, the present invention provides a method that ensures the area surrounding a junction is sealed evenly with a material that provides a compression seal between the pipe liner and the pipe and/or manhole. Thirdly, the present invention provides a method and apparatus that provides a fast and neat installation of a member to seal annular space, without the need for spraying or pasting methods to attach the material to the host pipe.

It should be understood that various changes and modifications to the presently preferred embodiment described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A pipe end seal comprising:
   a molded, nonmetallic tubular sleeve having an outer diameter approximately equal to an end of a pipe to be sealed; and
   a mechanical fastener adapted to retain the shape of the tubular sleeve and positioned against an inner wall of the tubular sleeve.

2. The pipe end seal of claim 1, wherein the tubular sleeve comprises a hydrophilic material.

3. The pipe end seal of claim 2, wherein the tubular sleeve comprises an elastomer.

4. The pipe end seal of claim 3, wherein the tubular sleeve comprises a rubber.

5. The pipe end seal of claim 3, wherein the tubular sleeve has a hardness less than 90 Shore A durometer scale.

6. The pipe end seal of claim 5, wherein the tubular sleeve has a hardness between 5 shore A durometer scale and 80 shore D durometer scale.

7. The pipe end seal of claim 6, wherein the tubular sleeve has thickness of 1-8 mm and a length of 2-10 inches.

8. The pipe end seal of claim 1, wherein the tubular sleeve further comprises a flange portion extending from an end of the tubular sleeve.

9. The pipe end seal of claim 1, wherein the mechanical fastener is a retaining ring.

10. The pipe end seal of claim 9, wherein the retaining ring is adapted to form a complete ring about the inner wall of the first tubular sleeve.

11. The pipe end seal of claim 1, wherein the mechanical fastener is a screw, nail, or anchor.

12. A method of sealing a pipe end, comprising:
    providing a molded, nonmetallic tubular sleeve having an outer diameter approximately equal to an end of a pipe to be sealed;
    placing the tubular sleeve within the pipe to be sealed adjacent the pipe end;
    securing the tubular sleeve within the pipe using a mechanical fastener placed against an inner wall of the tubular sleeve; and
    placing a pipe liner against the inner wall of the tubular sleeve.

13. The method of claim 12, wherein the tubular sleeve comprises a hydrophilic material.

14. The method of claim 12, wherein the tubular sleeve comprises a rubber.

15. The method of claim 12, wherein the pipe liner is a selected from the group consisting of a cured-in-place pipe liner, a folded liner, or a spray-on liner.

16. The method of claim 12, wherein the tubular sleeve further comprises a flange portion extending from an end of the tubular sleeve.

17. The method of claim 16, wherein the flange portion extends generally greater than the pipe liner.

18. The method of claim 17, further comprising placing a second liner against the flange portion.

19. The method of claim 18, wherein the second liner is a manhole liner and the pipe to be sealed is a sewer pipe.

20. The method of claim 19, wherein the manhole liner is selected from the group consisting of a cured-in-place manhole liner, a spray-on manhole liner, a cementitious manhole liner, a cast-in-place manhole liner, and a resin manhole liner.

21. The method of claim 12, wherein the pipe to be sealed is a sewer pipe.

22. The method of claim 12, wherein the mechanical fastener comprises a retaining ring.

23. The method of claim 22, wherein the retaining ring is adapted to form a complete ring about the inner wall of the first tubular sleeve.

24. A kit for sealing the annulus between a pipe and a pipe liner at an end of the pipe liner, comprising:
    a molded, nonmetallic tubular sleeve having an outer diameter approximately equal to an end of a pipe to be sealed; and
    a mechanical fastener having a diameter approximately equal to the end of the pipe to be sealed; and
    a pipe liner.

25. The kit of claim 24, wherein the tubular sleeve has a hardness of less than 90 Shore A Durometer Scale.

26. The kit of claim 25, wherein the tubular sleeve further comprises a flange portion extending about an end of the tubular sleeve.

27. The kit of claim 26, wherein the tubular sleeve comprises an elastomer.

28. The kit of claim 26, further comprising an adhesive on the flange portion of the tubular sleeve.

29. The kit of claim 24, further comprising a second liner.

30. The kit of claim 29, wherein the pipe liner is selected from the group consisting of a cured-in-place liner, a folded liner, and a spray-on liner; and wherein the second liner is selected from the group consisting of a cured-in-place liner, a spray-on liner, a cementitious liner, a cast-in-place liner, and a resin liner.

31. The kit of claim 24, further comprising a second tubular sleeve constructed of a hydrophilic material having an outer wall having a diameter approximately equal to a diameter of a second pipe or manhole.

32. The kit of claim 31, further comprising a second mechanical fastener having a diameter approximately equal to the diameter of the second pipe or manhole.

33. The kit of claim 24, further comprising an adhesive on an outer wall of the tubular sleeve.

* * * * *